United States Patent
Luo et al.

(10) Patent No.: US 6,485,739 B2
(45) Date of Patent: Nov. 26, 2002

(54) STAIN REMOVING CHEWING GUM AND CONFECTIONERY COMPOSITIONS, AND METHODS OF MAKING AND USING THE SAME

(75) Inventors: Shiuh John Luo, Livingston, NJ (US); Samantha K. Holme, Pompton Plains, NJ (US)

(73) Assignee: Warner-Lambert Company, Morris Plains, NJ (US)

( * ) Notice: Subject to any disclaimer, the term of this patent is extended or adjusted under 35 U.S.C. 154(b) by 0 days.

(21) Appl. No.: 09/947,876

(22) Filed: Sep. 6, 2001

(65) Prior Publication Data

US 2002/0159955 A1 Oct. 31, 2002

Related U.S. Application Data

(60) Provisional application No. 60/188,554, filed on Mar. 10, 2000.

(51) Int. Cl.$^7$ .............................. A61K 7/16; A61K 9/20; A61K 9/68
(52) U.S. Cl. ...................... 424/440; 424/48; 424/435; 424/49; 426/3; 426/103
(58) Field of Search .................. 424/48, 440; 426/345, 426/103, 660

(56) References Cited

U.S. PATENT DOCUMENTS

| | | | |
|---|---|---|---|
| 2,197,719 A | | 4/1940 | Conner |
| 3,052,552 A | | 9/1962 | Koerner et al. |
| 3,664,962 A | * | 5/1972 | Kelly et al. .................. 252/125 |
| 3,872,021 A | * | 3/1975 | McKnight ................... 252/121 |
| 3,912,817 A | | 10/1975 | Sapsowitz |
| 4,148,872 A | | 4/1979 | Wagenknecht et al. |
| 4,150,112 A | | 4/1979 | Wagenkneckt et al. |
| 4,156,715 A | | 5/1979 | Wagenknecht et al. |
| 4,156,716 A | | 5/1979 | Wagenknecht et al. |
| 4,157,385 A | | 6/1979 | Wagenknecht et al. |
| 4,159,315 A | | 6/1979 | Wagenknecht et al. |
| 4,160,054 A | | 7/1979 | Wagenknecht et al. |
| 4,160,820 A | | 7/1979 | Wagenknecht et al. |
| 4,208,431 A | | 6/1980 | Friello et al. |
| 4,217,368 A | | 8/1980 | Witzel et al. |
| 4,224,345 A | | 9/1980 | Tezuka et al. |
| 4,271,199 A | | 6/1981 | Cherukuri et al. |
| 4,352,825 A | | 10/1982 | Cherukuri et al. |
| 4,585,649 A | | 4/1986 | Lynch |
| 4,753,790 A | * | 6/1988 | Silva et al. .................. 424/440 |
| 4,828,845 A | * | 5/1989 | Zamudio-Tena et al. ........ 426/5 |
| 4,842,762 A | * | 6/1989 | Sabol et al. ................. 252/109 |
| 4,952,407 A | | 8/1990 | Record et al. |
| 5,017,385 A | * | 5/1991 | Wienecke, I .................... 426/5 |
| 5,073,389 A | * | 12/1991 | Wienecke, II ............... 426/103 |
| 5,256,402 A | | 10/1993 | Prencipe et al. |
| 5,380,530 A | | 1/1995 | Hill |
| 5,391,315 A | * | 2/1995 | Ashkin ....................... 252/108 |
| 5,629,035 A | | 5/1997 | Miskewitz |
| 5,645,821 A | | 7/1997 | Libin |
| 5,698,215 A | * | 12/1997 | Kalili et al. ................. 424/440 |
| 5,713,738 A | * | 2/1998 | Yarborough ................. 433/215 |
| 5,736,175 A | | 4/1998 | Cea et al. |
| 5,756,074 A | | 5/1998 | Ascione et al. |
| 5,824,291 A | * | 10/1998 | Howard ....................... 426/48 |
| 5,879,728 A | * | 3/1999 | Graff et al. ..................... 426/5 |

FOREIGN PATENT DOCUMENTS

| | | |
|---|---|---|
| WO | WO 88/00463 | 1/1988 |
| WO | WO 92/06160 | 4/1992 |
| WO | WO 95/33034 | 12/1995 |
| WO | WO 96/19193 | 6/1996 |
| WO | WO 97/02011 | 1/1997 |
| WO | WO 98/18339 | 5/1998 |
| WO | WO 98/23165 | 6/1998 |
| WO | WO 98/29088 | 7/1998 |
| WO | WO 99/27798 | 6/1999 |
| WO | WO 99/43924 | 9/1999 |
| WO | WO 00/35298 | 6/2000 |

* cited by examiner

*Primary Examiner*—Shep K. Rose
(74) *Attorney, Agent, or Firm*—Allen R. Kipnes

(57) ABSTRACT

A composition in the form of a chewing gum composition or a confectionery composition containing stain removing agent selected from anionic and non-ionic surfactants and methods of preparing and using the same to remove stains from dental material including teeth.

1 Claim, No Drawings

STAIN REMOVING CHEWING GUM AND CONFECTIONERY COMPOSITIONS, AND METHODS OF MAKING AND USING THE SAME

RELATED APPLICATION

This application claims the priority of U.S. patent application Ser. No. 09/741,523 filed Dec. 20, 2000 which claims the priority benefit of U.S. Provisional Patent Application Ser. No. 60/188,554 filed on Mar. 10, 2000.

FIELD OF THE INVENTION

The present invention is generally directed to chewing gum and confectionery compositions containing an effective amount of a stain removing component selected from anionic and non-ionic surfactants and to processes of making the compositions in a manner which facilitates the release of the stain removing component.

BACKGROUND OF THE INVENTION

Tooth whitening or stain removing components are known to be added to dentifrice compositions such as toothpastes, mouthwashes, and the like. Such compositions include dicalcium phosphates, peroxides, percarbonates and the like such as disclosed in, for example, U.S. Pat. Nos. 5,256,402; and 5,824,291.

The employment of surfactants including non-ionic surfactants is known for laundry detergent compositions. Such surfactants are disclosed, for example, in International Publication Nos. WO 92/06160 and WO 95/33034. The use of non-ionic surfactants in laundry detergent compositions is known to improve the effectiveness of such compositions against greasy/oily stains.

U.S. Pat. No. 5,645,821 discloses an oral hygiene composition to clean and whiten teeth which includes water, gelling agent, anionic surfactant and a mixture of alkaline earth metal hydroxides and carbonates. WO 88/00463 discloses an oral composition for removing and/or preventing plaque and for removing stains which includes an oily compatible surfactant and at least one weight percent of a benzoic acid salt. The composition is also stated to contain a biocide such as chlorhexidine or derivative thereof. An exemplified surfactant is sodium lauryl sulfate and the composition is also stated to contain plasticizers including polyethylene glycol, glycerin and the like. The reference states that the composition may be used in the form of dentifrices, lozenges or chewing gum.

Other chewing gum compositions and the active ingredient for removing stains disclosed therein include WO 99/43294 (chlorite ion); WO 99/27798 (a water-soluble product including sodium bicarbonate and encapsulated aspartame); Chinese Patent Document No. 1196235 (hydrogen peroxide); U.S. Pat. No. 5,824,291 (alkaline metal carbonate peroxyhydrates); WO 98/29088 (cysteine proteinase); WO 98/18339 (bone minerals, calcium triphosphate and/or hydroxyapatite); and U.S. Pat. No. 5,629,035 (alkaline metal bicarbonates).

U.S. Pat. No. 4,952,407 discloses a gum composition containing a dental plaque removing agent in the form of glycerol monolaurate. The composition typically includes a high filler content wherein the filler is an inorganic material such as calcium carbonate, talc, sodium bicarbonate dicalcium phosphate and mixtures thereof.

For coated chewing gum compositions, it is known to provide an active agent such as a medicament in the chewing gum coating and optionally in the core such as disclosed in WO 00/35296 and WO 00/35298.

Unlike toothpaste, mouthwash and other dentifrice compositions, gum compositions present unique problems in delivering agents. Chewing gum compositions typically comprise a water-insoluble gum base which provides the bulk to the gum composition but which invariably traps agents having compatibility with the gum base. Adding additional amounts of an agent is problematical because the same can have an adverse effect on the integrity, sensory and/or taste properties of the gum composition.

It would therefore be a significant advance in the art of providing a stain removing agent for the cleaning of dental material including teeth if such stain removing agent could be effectively incorporated into a chewing gum composition and released therefrom during the chewing process in a manner which provides an effective amount of the stain removing agent. The chewing gum composition would then not only provide chewing satisfaction to the user, but would also provide a beneficial dental effect.

Confectionery compositions are well known in the art. Such compositions include, for example, hard boiled candies, nougats, panning goods, gel confections, centerfill confections, fondants, and the like. Unlike chewing gum compositions which often remain in the mouth for several minutes and often quite longer, confectionery compositions tend to have a short life in the mouth because they dissolve relatively quickly upon chewing. Nonetheless, it would be of great benefit to provide confectionery compositions with an effective amount of a stain removing agent to provide such products to render them capable of providing a beneficial dental effect.

SUMMARY OF THE INVENTION

The present invention is generally directed to stain-removing chewing gum and confectionery compositions in which a stain removing material has been effectively incorporated therein so that a sufficient amount is available for a stain removing effect.

In a particular aspect of the present invention, there is provided a stain-removing composition selected from a chewing gum composition and a confectionery composition comprising a stain removing effective amount of at least one stain removing agent selected from the group consisting of anionic and non-ionic surfactants, said stain removing agent being present in a manner which enables an effective amount of the stain removing agent to be released from the composition.

In accordance with one aspect of the present invention, there is provided a stain removing chewing gum composition comprising a core and a coating comprised of at least one layer with at least one of the core and coating comprising a stain removing effective amount of at least one stain removing agent selected from the group consisting of anionic and non-ionic surfactants and mixtures thereof. A method of removing stains by employing the chewing gum composition of the present invention is also disclosed.

In a further aspect of the invention, there is provided a chewing gum composition in which the stain removing agent is added at a time in the process of making the same which enhances release of the stain removing agent during the chewing operation.

In a still further aspect of the present invention there is provided a stain removing confectionery composition comprising a stain removing effective amount of at least one stain removing agent selected from the group consisting of anionic and non-ionic surfactants and mixtures thereof. A method of removing stains by employing the confectionery compositions of the present invention is also disclosed.

In a preferred form of the invention, the surfactants for both the gum and confectionery compositions are selected from the group consisting of medium and long chain fatty acid esters and salts, most preferably containing 14–20 carbon atoms, and especially sodium stearate and sodium palmitate and mixtures thereof, as well as a mixture of citric acid esters of mono and diglycerides.

DETAILED DESCRIPTION OF THE INVENTION

Applicants have determined that an effective stain removing chewing gum and confectionery compositions can be prepared by a suitable selection of stain-removing agents and the formulation of the gum and confectionery compositions and the manner in which the stain-removing agents are added to the compositions which enables the release of the stain-removing agent in an effective amount so that it may come into contact with dental surfaces including tooth surfaces while maintaining the organoleptic properties commonly associated with such products.

The chewing gum compositions of the present invention, may be coated or uncoated and be in the form or slabs, sticks, pellets, balls and the like. The composition of the different forms of the chewing gum compositions will be similar but may vary with regard to the ratio of the ingredients. For example, coated gum compositions may contain a lower percentage of softeners. Pellets and balls have a small chewing gum core, which is then coated with either a sugar solution or a sugarless solution to create a hard shell. Slabs and sticks are usually formulated to be softer in texture than the chewing gum core. For practice of the present invention however, in order to overcome any detrimental softening effect the surfactant active may have on the gum base, it is preferred to formulate a slab or stick gum having a firmer texture (i.e. with less softener than is typically employed).

Centerfilled gum is another common gum form. The gum portion has a similar composition and mode of manufacture to that described above. However, the centerfill is typically an aqueous solution or gel, which is injected into the center of the gum during processing. The stain removing agent could optionally be incorporated into the centerfill during manufacture of the fill or into the chewing gum. The centerfill gum may also be optionally coated and may be prepared in various forms such as in the form of a lollipop.

For practice of the present invention it is preferred to use a coated gum wherein the stain removing agent is in at least one of the core and the coating. Most preferred for removing stains is a coated gum wherein the stain removing agent is at least in the coating.

The chewing gum composition of the present invention includes gum base and most of the other typical chewing gum composition components such as sweeteners, softeners, flavorants and the like. At least one stain removing agent is employed in the present invention which is selected from anionic and non-ionic surfactants. The chewing gum composition may contain a reduced amount of softening agents such as lecithin or glycerin or may eliminate softeners. In addition, the chewing gum composition may contain a larger amount of sugar alcohols than conventional chewing gum compositions to facilitate delivery of the stain removing agent employed in the present invention to the tooth surfaces.

In accordance with one aspect of the chewing gum composition of the present invention, the stain removing agent is added during the manufacture of the chewing gum composition, that is, with the sweeteners, flavorants and the like. In another aspect of the present invention, the stain removing agent is added as one of the last steps, preferably the last step in the formation of the chewing gum composition. Applicants in have determined that this process modification incorporates the stain removing agent into the gum composition without materially binding the stain-removing agent therein such as may occur if the stain removing agent is mixed directly with the gum base. Thus, the stain-removing, while only loosely contained within the gum composition can be more effectively released therefrom during a typical chewing operation. Thus a material portion of the stain removing agent is free of the gum base.

In a further aspect of the invention, the insoluble gum base generally comprises elastomers, elastomer plasticizers, waxes, fats, oils, emulsifiers, fillers, texturizers and may include a desirable stain-removing agent as hereinafter described.

Elastomers constitute from about 5 to 95% by weight of the base, preferably 10 to 70% by weight and most preferably 15 to 45% by weight. Examples of elastomers includes synthetic elastomers such as polyisobutylene, polybutylene, isobutylene-isoprene co-polymers, styrene-butadiene co-polymers, polyvinylacetate and the like. Elastomers may also include natural elastomers such as natural rubber as well as natural gums such as jelutong, lechi caspi, perillo, massaranduba balata, chicle, gutta hang kang or mixtures thereof. Other elastomers are known to those of ordinary skill in the art.

Elastomer plasticizers modify the finished gum firmness this when used in the gum base. Elastomer plasticizers are typically present in an amount of from about 0 to 75% by weight of the gum base, preferably from about 5 to 45% by weight and most preferably from about 10 to 30% by weight. Examples of elastomer plasticizers include natural rosin esters such as glycerol ester of partially hydrogenated rosin, glycerol ester of tall oil rosin, pentaerythritol esters of partially hydrogenated rosin, methyl and partially hydrogenated methyl esters of rosin, and the like. Synthetic elastomer plasticizers such as terpene resins may also be employed in gum base composition.

Waxes include synthetic and naturally occurring waxes such as polyethylene, bees wax, carnauba and the like. Petroleum waxes such a paraffin may also be used. The waxes may be present in the amount of from about 0 to 30% by weight of the gum base. Waxes aid in the curing of the finished gum and help improve the release of flavor and may extend the shelf life of the product.

Fillers modify the texture of the gum base and aid processing. Examples of such fillers include magnesium and aluminum silicates, clay, alumina, talc, titanium oxide, cellulose polymers, and the like. Fillers are typically present in an amount of from 1 to 60% by weight.

Examples of softeners used in gum base include hydrogenated and partially hydrogenated vegetable oils, cocoa butter, glycerol monostearate, glycerol triacetate, di and tri glycerides, fatty acids such as stearic acid, palmitic acid, oleic acid, linoleic acid, linolenic acid and the like.

The gum base constitutes between 5 and 95% by weight of the chewing gum composition, more typically 10 to 50% by weight, and most preferably 25 to 35% by weight of the chewing gum. A higher amount of gum base is preferred.

Other ingredients used in chewing gum compositions include sweeteners, both natural and artificial and both sugar and sugarless. Sweeteners are typically present in the chewing gum compositions in amounts of from about 20 to 80% by weight, preferably from about 30 to 60% by weight. Sugarless sweeteners include, but are not limited sugar alcohols such as sorbitol, mannitol, xylitol, hydrogenated starch hydrolysates, maltitol and the like may also be present. High intensity sweeteners such as sucralose, aspartame, salts of acesulfame, and the like. High intensity sweeteners are typically present from about 0 to 1.0% by weight.

Flavoring agents which can vary over a wide range may be selected in amounts from about 0.1 to 10.0% by weight, preferably from about 0.5 to 5.0% by weight. Flavoring agents for use in chewing gum compositions are well known and include citrus oils, peppermint oil, spearmint oil, oil of wintergreen, menthol and the like.

Softeners may be present to modify the texture of the chewing gum composition. Unlike typical gum compositions, softeners in the compositions of the present invention are typically present in reduced amounts of from about 0.5 to 10% by weight based on the total weight of the chewing gum.

Other materials which may be present in the gum composition of the present invention include antioxidants (e.g. butylated hydroxyanisole, butylated hydroxytoluene, beta-carotenes, tocopherols, colorants, flavorants and the like.

Coating techniques for applying a coating for a chewing gum composition such as pan and spray coating are well known. Preferred in the practice of the present invention is coating with solutions adapted to build a hard candy layer. Both sugar and sugar alcohols may be used for this purpose together with high intensity sweeteners, colorants, flavorants and binders. When the stain removing agent is provided in the coating of a chewing gum composition, a solution of the stain removing agent is preferably, alternately, applied with the flavorant.

The sweetener may be present in an amount of from about 30% to about 80% by weight of the coating syrup. The binder may be present in an amount of from about 1% to about 15% by weight of the coating syrup. Minor amounts of the optional additives may also be present. The sweeteners suitable for use in the coating syrup comprise sugarless sweeteners such as the polyhydric alcohols, e.g., xylitol, sorbitol, mannitol, and mixtures, thereof; as well as maltitol, isomaltitol, hydrogenated starch hydrolysates, and hydrogenated glucose syrups. Mono, di-and polysaccharide may also be included. For example, sugars such as sucrose, fructose, glucose, galatose and maltose may also be employed as a sweetener. Other sweeteners suitable for use in the coating syrup include, but are not limited to free saccharin acid, water soluble salts of saccharin, cyclamate salts, palatinit dihydrochalcones, glycyrrhizin, L-aspartyl-L-phenylalanine methyl ester, amino acid based sweeteners, talin, steviosides, dihydrochalcone compounds, acesulfame salts and mixtures thereof.

Other components may be added in minor amounts to the coating syrup and include moisture absorbing compounds, anti-adherent compounds, dispersing agents and film forming agents. The moisture absorbing compounds suitable for use in the coating syrups include mannitol or dicalcium phosphate. Examples of useful anti-adherent compounds, which may also function as a filler, include talc, magnesium trisilicate and calcium carbonate. These ingredients may be employed in amounts of about 0.5% to about 5% by weight of the syrup. Examples of dispersing agents which may be employed in the coating syrup include titanium dioxide, talc or other anti-adherent compounds as set forth above.

The coating syrup is usually heated and a portion thereof deposited on the cores. Usually a single deposition of the coating syrup is not sufficient to provide the desired amount or thickness of coating and it usually will be necessary to apply second, third or more coats of the coating syrup in order to build up the weight and thickness of the coating to desired levels with layers allowed to dry in-between coats.

A preferred aspect of the chewing gum composition invention adds a stain removing agent to the coat. The stain removing agent is preferably applied subsequent to the syrup coating. It is preferred to then apply a coat of high intensity sweetener prior to coating with the stain removing agent. Application of the stain removing agent is preferably done alternatively to application of a flavorant solution. In the practice of the present invention the stain removing agent may be applied as a solution or may be applied as a dry charge or, where applicable, melted and applied. For fatty acid salts a dry charge may be preferred. In coating a chewing gum composition, the applications of coating syrup are continued until the average gum piece weight reaches the required coating weight, preferably until the coat comprises 20–30% by weight of the final pellet weight.

The present invention also encompasses confectionery compositions containing a suitable selection of stain-removing agents. Confectionery compositions include compressed tablets such as mints, hard boiled candies, nougats, gels, centerfill confections, fondants, panning goods and other compositions falling within the generally accepted definition of confectionery compositions.

Confectionery compositions in the form of pressed tablets such as mints may generally be made by combining finely sifted sugar or sugar substitute, flavoring agent (e.g. peppermint flavor) bulking agent such as gum arabic, and an optional coloring agent. The flavoring agent, bulking agent are combined and then gradually the sugar or sugar substitute are added along with a coloring agent if needed.

The product is then granulated by passing through a seize of desired mesh size (e.g. 12 mesh) and then dried at typically 55 to 60° C. The resulting powder is fed into a tableting machine fitted with a large size punch and the resulting pellets are broken into granules and then pressed.

High boiled candies typically contain sugar or sugar substitute, glucose, water, flavoring agent and optional coloring agent. The sugar is dissolved in the water and glucose is then added. The mixture is brought to a boil. The resulting liquid to which may previously have been added a coloring agent is poured onto an oiled slab and cooled. The flavoring agent are then added and kneaded into the cooled mass. The resulting mixture is then fed to a drop roller assembly known in the art to form the final hard candy shape.

A nougat composition typically includes two principal components, a high boiled candy and a frappe. By way of example, egg albumen or substitute thereof is combined with water and whisked to form a light foam. Sugar and glucose are added to water and boiled typically at about 130–140° C. and the resulting boiled product is poured into a mixing machine and beat until creamy.

The beaten albumen and flavoring agent are combined with the creamy product and the combination is thereafter thoroughly mixed.

Further details regarding the preparation of confectionery compositions can be found in Skuse's Complete Confectioner (13$^{th}$ Edition) (1957) including pp.41–71, 133–144, and 255–262; and Sugar Confectionery Manufacture (2$^{nd}$ Edition) (1995), E. B. Jackson, Editor, pp.129–168, 169–188, 189–216, 218–234, and 236–258 each of which is incorporated herein by reference.

In accordance with the present invention, a stain-removing effective amount of an anionic and/or non-ionic surfactant is employed as a stain-removing agent for chewing gum and confectionery compositions. Typical examples of the stain removing agents which may be employed in the present invention include sulfated butyl oleate, medium and long chain fatty acid esters and salts in particular the sodium and potassium salts of the stearate and palmitate, and methyl and ethyl esters thereof, sodium oleate, salts of fumaric acid, potassium glomate, organic acid esters of mono and diglycerides such as stearyl monoglyceridyl citrate, succistearin, dioctyl sodium sulfosuccinate, glycerol tristearate, lecithin, hydroxylated lecithin, sodium lauryl sulfate, acetylated monoglycerides, succinylated monoglycerides, monoglyceride citrate, ethoxylated mono-and diglycerides, sorbitan monostearate, calcium stearyl-2-lactylate, sodium stearyl lactylate, lactylated fatty acid esters of glycerol and propylene glycerol, glycerol-lactoesters of C8–C24 fatty acids, preferably glycerol-lactoesters of C14–C20 fatty acids, polyglycerol esters of C8–C24 fatty acids, preferably polyglycerol esters of C14–C20 fatty acids, propylene glycol alginate, sucrose C8–C24 fatty acid esters, preferably sucrose C14–C20 fatty acid esters, diacetyl tartaric or citric acid esters of mono and diglycerides, triacetin and the like and mixtures thereof.

Exemplary preferred stain removing agents are selected from sodium stearate and sodium palmitate and mixtures thereof, sodium oleate, a mixture of citric acid esters or lactic acid esters of monoglycerides and diglycerides, as for example, glycerol sterate lactate, glycerol stearate and glycerol lactate and mixtures thereof, sucrose monostearate, sucrose distearate, sucrose monolaurate, sucrose dilaurate, polyglycerol esters of monostearate, polyglycerol esters of monolaurate and mixtures thereof.

The preferred surfactants for use in chewing gum compositions of the present invention are sodium stearate, usually available as an approximate 50/50 mixture with sodium palmitate, and, a mixture of at least one citric acid ester of mono and/or diglycerides. A suitable example of a commercial stain removing agent in the latter class is IMWITOR 370® sold by Condea Vista Company. A further preferred surfactant is a mixture of lactic acid esters of monoglycerides and diglycerides.

The amount of the stain-removing agent for chewing gum compositions is typically from about 0.2 to 2.0% by weight based on the total weight of the chewing gum composition. The preferred amount of the stain-removing agent is from about 0.4 to 1.2% by weight. The amount of the stain removing agent will vary depending upon the particular individual or combinations of stain-removing agents employed, the type of other components of the chewing gum composition and their respective amounts. For example, a preferred amount of sodium stearate is about 0.5% by weight, a preferred amount of a mixture of lactic acid esters of monglycerides and diglycerides is about 0.6% by weight while a preferred amount of a mixture of citric acid esters of mono-and diglycerides (IMWITOR 370® is from about 0.6 to 1.0% by weight.

The preferred stain removing agents for use in the confectionery compositions of the present invention are sodium stearate, sodium palmitate and mixtures thereof. As indicated in connection with the chewing gum compositions, sodium stearate is usually available as an approximately evenly divided mixture with sodium palmitate.

The amount of the stain removing agent which may be employed in the confectionery compositions of the present invention will vary over a range depending on, for example, the type of confectionery composition and the particular individual or combination of stain removing agents which are employed. Generally, the amount of stain removing agent used in the confectionery compositions of the present invention will exceed the amount of the stain removing agent employed for the chewing gum composition for a particular stain removing agent.

Typically, the stain removing agent for confectionery compositions will be present in an amount of from about 0.2 to 20% by weight based on the total weight of the confectionery composition. The preferred amount of the stain removing agent is from about 3 to 17% by weight.

EXAMPLES

The following examples are submitted for illustrative purposes only and are not intended to limit the scope of the application as fully covered by the specification and claims.

Example 1

Preparation of Gum Products

A. Slab Gums

TABLE 1

| Ingredient | Sample 1 | Sample 2 |
| --- | --- | --- |
| Gum base | 29.75 | 29.75 |
| Atomite (Filler) | 4.2500 | 4.2500 |
| Sorbitol | 49.9868 | 49.4868 |
| Mannitol | 10.00 | 10.00 |
| Glycerin | 1.00 | 1.00 |
| High Intensity sweetener* | 1.3632 | 1.3632 |
| Flavor | 3.1500 | 3.1500 |
| Sodium stearate** | 0.500 | — |
| IMWITOR 370 ® | — | 1.00 |
| Totals | 100.00 | 100.00 |

*Aspartame, Ace K mixtures
**Sodium stearate/sodium palmitate @ 50/50

Samples 1 and 2 of the chewing gum compositions identified in Table 1 were prepared by conventional methods. The gum base was heated to sufficiently soften the base without adversely affecting the physical and chemical make up of the base. The molten gum base and the filler were then added to a mixing keftle. The sugar alcohols, glycerin, flavor, high intensity sweetener and stain removing agent were added with mixing to obtain a homogenous mixture, with the stain removing agent added last. The mixture was then discharged from the mixing kettle and rolled and scored into a desired piece size by conventional techniques.

Samples 3 of the chewing gum compositions shown in Table 2 was prepared in the same manner as Samples 1 and 2 except that the mixture was rolled and scored into a typical stick gum form. Samples 4–6 are prepared in the same manner as Sample 3.

TABLE 2

| Ingredient | Sample 3 | Sample 4 | Sample 5 | Sample 6 |
| --- | --- | --- | --- | --- |
| Gum base | 36.600 | 36.600 | 36.600 | 36.600 |
| Sorbitol | 38.773 | 38.773 | 38.773 | 38.773 |
| Mannitol | 11.000 | 11.000 | 11.000 | 11.000 |
| Xylitol | 2.500 | 2.500 | 2.500 | 2.500 |
| Hydrogenated Corn Syrup | 7.000 | 7.000 | 7.000 | 7.000 |

TABLE 2-continued

| Ingredient | Sample 3 | Sample 4 | Sample 5 | Sample 6 |
|---|---|---|---|---|
| High Intensity Sweetener* | 0.264 | 0.264 | 0.264 | 0.264 |
| Flavor | 3.263 | 3.263 | 3.263 | 3.263 |
| Glycerol Stearate Lactate | 0.600 | — | — | — |
| Sugar Ester** | — | 0.600 | — | — |
| Polyglycerol fatty acid ester | — | — | 0.600 | — |
| Imwitor 370 | — | — | — | 0.600 |
| Totals | 100.000 | 100.000 | 100.000 | 100.000 |

*Aspartame/Ace K mixtures
**Sucrose Stearate or Sucrose Laurate
***Mono-Stearate or Mono-Laurate Sample 7 of the chewing gum composition identified in Table 3 was prepared by conventional methods in the same manner as described above in connection with Samples 1 and 2. Samples 8 and 9 are prepared in the same manner as Sample 7.

TABLE 3

| Ingredient | Sample 7 | Sample 8 | Sample 9 |
|---|---|---|---|
| Gum base | 36.600 | 36.600 | 36.600 |
| Maltitol | 25.273 | 25.273 | 25.273 |
| Xylitol | 29.000 | 29.000 | 29.000 |
| Hydrogenated Corn Syrup | 5.000 | 5.000 | 5.000 |
| High Intensity Sweetener* | 0.264 | 0.264 | 0.264 |
| Flavor | 3.263 | 3.263 | 3.263 |
| Glycerol Stearate Lactate | 0.600 | — | — |
| Sugar Ester** | — | 0.600 | — |
| Polyglycerol fatty acid ester*** | — | — | 0.600 |
| Totals | 100.000 | 100.000 | 100.00 |

High Intensity Sweetener*: Aspartame/Ace K mixtures
Sugar Ester**: Sucrose Stearate or Sucrose Laurate
Polyglycerol fatty acid ester***: Mono-Stearate or Mono-Laurate B. Coated Gums—Stain Removing Agent in Coat

TABLE 4

| Ingredient | Sample 10 | Sample 11 | Sample 12 |
|---|---|---|---|
| Core Gum | | | |
| Gum Base | 26.250 | 26.250 | 26.250 |
| Atomite (Filler) | 3.750 | 3.750 | 3.750 |
| Sorbitol | 33.525 | 33.525 | 33.5250 |
| Mannitol | 7.500 | 7.500 | 7.500 |
| Flavorant | 2.8075 | 2.8075 | 2.8075 |
| Glycerin | 1.00 | 1.00 | 1.00 |
| High Intensity Sweetener* | 0.7875 | 0.7875 | 0.7875 |
| Coat | | | |
| Maltitol | 22.1228 | 21.6228 | 22.1228 |
| Ace-K | 0.0350 | 0.0350 | 0.0350 |
| Flavorant | 0.343 | 0.343 | 0.343 |
| Gum Arabic | 1.1678 | 1.1678 | 1.1678 |
| Titanium Dioxide | 0.1780 | 0.1780 | 0.1780 |
| Candelilla Wax | 0.0334 | 0.0334 | 0.0334 |
| Sodium stearate** | 0.500 | — | — |
| IMWITOR 370 ® | — | 1.00 | — |
| Sodium Oleate | — | — | 0.5000 |
| Total | 100.00 | 100.00 | 100.00 |

*Aspartame, Ace K mixtures
**Sodium stearate/palmitate @ 50/50.

Gum cores were prepared by the same conventional methods as in part A herein. The molten gum base and the filler were added to the mixing kettle and mixing was commenced. The sugar alcohols, glycerin, flavors, and high intensity sweetener mixture, were added in portions with mixing to obtain a homogenous mixture. The mixture was then discharged from the mixing kettle and formed into cores by conventional techniques.

The cores were placed into a coating pan and broken into individual pieces as necessary. A sugarless solution containing 70% by weight of maltitol, as well as titanium dioxide, gum arabic and water was heated to between 70° and 80° C. The solution was sprayed onto the gum core pieces in layers and allowed to dry between sprays while the coating pan was continually rotating to ensure a smooth even coat of the gum cores.

The coating was built up to about 8% by weight of the final pellet weight. Ace-K was then added and then covered with another layer of the above-mentioned coating solution and then allowed to dry.

A 20% solution of the stain removing agent identified in Table 2 was prepared by heating water to between 65° and 75° C. and then slowly adding the stain removing agent. The solution was mixed under low agitation to avoid foaming until a clear solution was obtained. The solution was maintained at the same temperature for the entire coating procedure.

After the high intensity sweetener layer was dried, the solution containing the stain removing agent and a flavorant were added in alternating layers until all of the respective materials were added with each layer being allowed to dry before the next layer was applied. The coating process continued with the coating solution until the coat comprised 24% by weight of the final pellet weight.

The coating was then topped with a conventional finishing solution until a shell weight of 25% by weight was obtained. The pellets were then polished in a polishing pan with candelilla wax in a convention manner.

Sample 13 of the chewing gum composition identified in Table 5 was prepared by conventional methods in the same manner as described above in connection with samples 10–12. Samples 14 and 15 are prepared in the same manner as Sample 13.

TABLE 5

| Ingredient | Sample 13 | Sample 14 | Sample 15 |
|---|---|---|---|
| Core Gum | | | |
| Gum base | 31.100 | 31.100 | 31.100 |
| Sorbitol | 27.074 | 27.074 | 27.074 |
| Mannitol | 7.700 | 7.700 | 7.700 |
| Xylitol | 2.500 | 2.500 | 2.500 |
| Hydrogenated Corn Syrup | 3.700 | 3.700 | 3.700 |
| High Intensity sweeter* | 0.272 | 0.272 | 0.272 |
| Flavor | 2.654 | 2.654 | 2.654 |
| Coating | | | |
| Maltitol | 21.947 | 21.947 | 21.947 |
| Ace-K | 0.035 | 0.035 | 0.035 |
| Flavors | 0.250 | 0.250 | 0.250 |
| Gum Arabic | 1.536 | 1.536 | 1.536 |
| Titanium Dioxide | 0.178 | 0.178 | 0.178 |
| Candelilla Wax | 0.054 | 0.054 | 0.054 |
| Glycerol Stearate Lactate | 1.000 | — | — |
| Sugar Ester** | — | 1.000 | — |
| Polyglycerol fatty acid ester*** | — | — | 1.000 |
| Totals | 100.000 | 100.000 | 100.000 |

*Aspartame/Ace K mixtures
**Sucrose Stearate or Sucrose Laurate
***Monostearate or Monolaurate C. Coated Gums—Stain Removing Agent in Core

TABLE 6

| Ingredient | Sample 16 |
|---|---|
| Core Gum | |
| Gum Base | 26.250 |
| Atomite (Filler) | 3.750 |
| Sorbitol | 32.962 |
| Mannitol | 7.500 |
| Glycerin | 1.00 |
| Flavorant | 2.8075 |
| High Intensity Sweetener* | 0.7875 |
| Sodium stearate** | 0.563 |
| Coat | |
| Flavorant | 0.343 |
| Ace-K | 0.0350 |
| Maltitol | 22.6228 |
| Gum Arabic | 1.1678 |
| Titanium Dioxide | 0.1780 |
| Candelilla Wax | 0.0334 |
| Total | 100.00 |

*Aspartame, Ace K mixtures
**Sodium stearate/palmitate @ 50/50

Gum cores were prepared by the same conventional methods as the slab gum in part A herein with the stain removing agent being added last. The mixture was then discharged from the mixing kettle and formed into cores by conventional techniques.

The cores were placed into a coating pan and coated as in Part B herein with the exception that the application of a stain removing agent-containing layer was eliminated from the process.

Example 2

Efficacy Tests of Gum Products

Mechanical Chew Test

Chewing gum Sample 16, prepared as previously described was tested in an in-vitro mechanical chewing model. A commercial whitening pellet-type gum containing sodium bicarbonate was used as a control. The gum samples were masticated by the chewing machine, which contained stained bovine teeth on the chewing surfaces to simulate the top and bottom teeth in a human mouth. The samples were chewed for five minutes. The bovine tooth samples were read with a Chrom-A-Meter before they were placed in the machine and after a simulated one week of chewing (28 doses). The color change is then determined by calculating the DE value. All of the stain is then removed from the bovine tooth samples and read again with the Chrom-A-Meter. The percent stain reduction is then calculated. The results are presented in Table 7.

TABLE 7

| | Stain Reduction | |
|---|---|---|
| | Control | Sample 16 |
| % Stain Reduction | 11.9% | 34.1% |

The test shows that Sample 16 provided a reduction in the occurrence of staining after the test period when compared to a commercial tooth whitening gum.

B. Clinical Tests

Test I:. Sixty individuals were divided into 4 groups of 15 individuals each.

Group I received no treatment. Group II received the chewing gum composition of Sample 10, and Group III received the chewing gum composition of Sample 12 while Group IV acted as a control and received the commercial pellet-type tooth whitening chewing gum containing sodium bicarbonate mentioned above.

Each of the individuals used the chewing gum after meals and the staining effect was observed after 2 and 4 week periods. The results are shown in Table 8.

TABLE 8

| | Stain Scores* | | | |
|---|---|---|---|---|
| Stain Scores | No Treatment | Sample 10 | Sample 12 | Control |
| Baseline | 1.04 | 1.04 | 1.04 | 1.04 |
| 2 week | 1.09 | 0.93 | 1.02 | 1.06 |
| 4 week | 1.43 | 1.30 | 1.24 | 1.38 |

*McPhearson Modification of the Lobene stain index

As shown in Table 8, Samples 10 and 12 provided a reduction in the occurrence of staining after the 4 week test period when compared to no treatment group and to the commercial pellet-type tooth whitening gum containing bicarbonate mentioned above.

Test II:. Two hundred individuals were divided into 4 groups of 50 individuals each. Group I received no treatment. Group II received the chewing gum composition of Sample 10, Group III received the chewing gum composition of Sample 11 while Group IV received the chewing gum composition of Sample 16.

Each of the individuals used the chewing gum after meals and the stain removing effect was observed after 4 to 8 week periods. The results are shown in Table 9.

TABLE 9

| | Stain Reduction | | | |
|---|---|---|---|---|
| | No Treatment | Sample 10 | Sample 11 | Sample 16 |
| | 4 Week | | | |
| p-value() Baseline) | 0.904 | <0.001 | 0.002 | <0.001 |
| % Change | 0.40 | 13.68 | 8.30 | 7.35 |
| | 8 Week | | | |
| p-value() Baseline) | 0.056 | <0.0001 | 0.002 | <0.001 |
| % Change | −5.67 | 20.17 | 10.04 | 14.29 |

TABLE 10

| | Pair Comparison | | |
|---|---|---|---|
| | Sample 10 | Sample 11 | Sample 16 |
| | 4 Week | | |
| No Gum | <0.001 | 0.010 | 0.018 |
| Sample 10 | — | 0.133 | 0.062 |
| Sample 11 | — | — | 0.755 |

TABLE 10-continued

Pair Comparison

|  | Sample 10 | Sample 11 | Sample 16 |
|---|---|---|---|
|  | 8 Week | | |
| No Gum | <0.001 | <0.001 | <0.001 |
| Sample 10 | — | 0.044 | 0.258 |
| Sample 11 | — | — | 0.319 |

As shown in Tables 9 and 10, the chewing gum composition of Samples 10, 11 and 16 exhibited a significant stain removing effect when compared to the no treatment group.

Example 3

Preparation of Pressed Mint Products

Sample 17

A 2000 batch of a composition for forming a pressed mint product in accordance with the present invention is prepared in the following manner.

Sorbitol 98.0% by weight, 0.5% by weight of silicon dioxide, 0.3% by weight of a flavoring agent, and 0.7% of Aspartame are mixed for two minutes in a blender until a homogenous mixture is obtained. Sodium stearate 0.1% by weight is added to the mixture which is then blended for four minutes. The resulting mixture is then formed into individual pressed tablets in a conventional manner.

Samples 18 and 19

The procedure set forth in Sample 17 is repeated except that the amount of sodium stearate is increased to 0.5% (Sample 18) and 3.0% (Sample 19), respectively with a corresponding reduction in the amount of sorbitol.

Sample 20 and Control

The procedure of Sample 17 was repeated for forming pressed tablet compositions containing the ingredients shown in Table 11.

TABLE 11

| INGREDIENT | SAMPLE 20 | CONTROL |
|---|---|---|
| Sorbitol Powder | 96.622 | 99.622 |
| Aspartame | 0.100 | 0.100 |
| Acesulfame Potassium Salt | 0.050 | 0.050 |
| Flavorant | 0.228 | 0.228 |
| Sodium Stearate | 3.000 | — |

Example 4

Efficacy Tests of Pressed Mint Products

The pressed tablets produced in accordance with Sample 20 and the control example were tested to determine their ability to remove stains from hydroxyapatite disks.

Deionized water 400 ml was heated to and maintained at 37° C. under a stirring with a stirring bar operating at 300 rpm. Two stained hydroxyapatite disks were suspended in the water. The test mints were dropped into the water and allowed to dissolve. As soon as the mints were dissolved the disks were removed from the test solution. The procedure was repeated for varying mint weight/dissolution times. The disks were read before and after treatment with a Chrom-A-Meter and the difference was calculated. This procedure was repeated using deionized water alone and the difference calculated between before and after treatment. The test samples were compared to the control sample and to the water as a control and the % difference in stain reduction was calculated. The results are shown in Table 12.

TABLE 12

| Weight/Dissolution Time | Water | Control |
|---|---|---|
| 1.0 g/3 min. | 84 | 52 |
| 1.5 g/4 min. | 45 | 31 |
| 1.75 g/4.5 min. | 101 | 26 |
| 2.0 g/5 min. | 56 | 11 |
| 2.25 g/5 min. | 81 | 22 |

The results shown in Table 12 show the percent improvement in stain reduction associated with Sample 20 as compared with water alone and the control mint composition having no stain removing agent present.

What is claimed is:

1. A method of removing stains from teeth in need thereof comprising placing an effective amount of a stain removing confectionery composition comprising a stain removing effective amount of a stain removing agent selected from the group consisting of sodium stearate, sodium palmitate and mixtures thereof as an essential stain removing agent into the oral cavity and in contact with stained dental and tooth surfaces until the composition is dissolved to thereby obtain stain reduction.

* * * * *